(12) United States Patent
Stackpoole et al.

(10) Patent No.: US 10,604,872 B1
(45) Date of Patent: Mar. 31, 2020

(54) WOVEN THERMAL PROTECTION SYSTEM

(71) Applicant: USA as Represented by the Administrator of the National Aeronautics & Space Administration (NASA), Washington, DC (US)

(72) Inventors: Margaret M. Stackpoole, Santa Clara, CA (US); Jay D. Feldman, Sunnyvale, CA (US); Donald T. Ellerby, Santa Clara, CA (US); Ethiraj Venkatapathy, Los Altos, CA (US); Curt G. Wilkinson, Fleetwood, PA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 707 days.

(21) Appl. No.: 14/199,936

(22) Filed: Mar. 6, 2014

(51) Int. Cl.
  *D03D 1/00* (2006.01)
  *B32B 5/02* (2006.01)
  *B32B 5/26* (2006.01)

(52) U.S. Cl.
  CPC ............ *D03D 1/0035* (2013.01); *B32B 5/024* (2013.01); *B32B 5/26* (2013.01); *B32B 2262/02* (2013.01); *B32B 2262/10* (2013.01); *B32B 2262/106* (2013.01); *B32B 2307/306* (2013.01); *B32B 2571/00* (2013.01); *B32B 2605/18* (2013.01)

(58) Field of Classification Search
  CPC ......... B32B 5/24; B32B 5/26; B32B 2262/02; B32B 2262/10; B32B 2262/106; B32B 2307/306; B32B 2571/00; B32B 2605/18; B32B 27/281; B32B 27/12; D03D 1/0035; D03D 15/12

USPC ................ 442/205–207, 218–220, 381–392; 428/212–220
See application file for complete search history.

(56) References Cited

U.S. PATENT DOCUMENTS

| 4,100,322 | A | | 7/1978 | Seibold et al. | |
|---|---|---|---|---|---|
| 5,451,448 | A | | 9/1995 | Sawko et al. | |
| 5,536,562 | A | * | 7/1996 | Tran .......................... | B64G 1/58 244/121 |
| 5,622,660 | A | * | 4/1997 | Uemura ................... | D01F 9/145 264/211.11 |

(Continued)

*Primary Examiner* — Lynda Salvatore
(74) *Attorney, Agent, or Firm* — Rhys W. Cheung; Robert M. Padilla (57) ABSTRACT

A thermal protection system (TPS) for a space vehicle that undergoes partial or full ablation when the TPS is exposed to severe heating during entry into a planetary atmosphere. A first layer includes at least one of carbon, phenolic, silica, alumina and another oxide, low thermal conductivity fibers and yarns connecting two or more first layer sub-layers, is recession-resistant and has reduced porosity. A second layer has a smaller fiber fraction, reduced thermal conductivity and reduced density, and serves as a thermal insulator. The first layer may have partial or full insertion of a resin, or may have a surface densified, recession-resistant sub-layer. Values of a first subset of as many as eight environmental parameters can be used to characterize the space vehicle mission. A second subset of TPS parameters for the system is evaluated to identify whether an ablator system with these TPS values can survive the conditions associated with the first subset of environmental parameters.

19 Claims, 9 Drawing Sheets

(56) References Cited

U.S. PATENT DOCUMENTS

| | | | |
|---|---|---|---|
| 5,985,405 A * | 11/1999 | Doucette, Jr. | B32B 7/08 |
| | | | 428/102 |
| 6,151,710 A * | 11/2000 | Bachner, Jr. | F41H 5/0485 |
| | | | 2/2.5 |
| 6,418,973 B1 | 7/2002 | Cox et al. | |
| 6,555,211 B2 | 4/2003 | Moody | |
| 2002/0090873 A1 * | 7/2002 | Moody | B32B 5/26 |
| | | | 442/268 |
| 2007/0224407 A1 * | 9/2007 | Covington | B32B 5/26 |
| | | | 428/292.1 |
| 2014/0287641 A1 * | 9/2014 | Steiner, III | B32B 5/26 |
| | | | 442/223 |
| 2014/0356571 A1 * | 12/2014 | Watanabe | B32B 5/24 |
| | | | 428/117 |
| 2015/0107715 A1 * | 4/2015 | Potluri | D03C 9/02 |
| | | | 139/11 |
| 2015/0122815 A1 * | 5/2015 | Musciano | B32B 5/26 |
| | | | 220/200 |

* cited by examiner

WOVEN THERMAL PROTECTION SYSTEM

ORIGIN OF THE INVENTION

The invention described herein was made in the performance of work under a NASA contract and by employees of the United States Government and is subject to the provisions of Public Law 96-517 (35 U.S.C. § 202) and may be manufactured and used by or for the Government for governmental purposes without the payment of any royalties thereon or therefore. In accordance with 35 U.S.C. § 202, the contractor elected not to retain title.

FIELD OF THE INVENTION

This invention relates to materials and material architectures that are useful in protecting a vehicle that is severely heated upon entering an atmosphere of a planetary body.

BACKGROUND OF THE INVENTION

In a typical space flight mission, a thermal protection system (TPS) material developed for use by N.A.S.A. has had no commercial or non-space flight applications, other than exploration or near term supply for the space voyagers. The TPS manufacturing processes could not leverage or rely upon common or well developed commercial processes. Because the number of N.A.S.A. missions has been small, typically less than one per year, N.A.S.A. has incurred very high costs to fabricate, and to maintain the capability to restart the fabrication of, a TPS material and the associated space vehicle structure. In some instances, an ability to fabricate a TPS material and the associated architecture is lost because the relevant technical personnel are no longer available.

A woven TPS material and associated fabrication procedure has several features, including: (1) an ability to improve the materials, procedures and/or architectures by incorporating incremental improvements that occur and are disclosed from time to time; (2) an ability to optimize the TPS architecture for a particular mission, and to introduce changes in response to unexpected changes in the mission late in the mission development cycle; (3) an ability to maintain an overall manufacturing capability for the general TPS processes, materials and associated tools, with relatively modest re-start or re-focus cost; and (4) maintenance and re-education of a technical staff and associated how-to knowledge that is periodically updated by periodic use of the staff and accumulated knowledge to design and fabricate an improved TPS. Ideally, the accumulated knowledge and know how should accommodate use of ranges of important parameters and fabrication techniques.

What is needed is a thermal protection system (i) that is reasonably efficient over a range of heating rates and cumulative heat loads, (ii) that undergoes partial or complete ablation when the associated vehicle is exposed to severe heating rates and/or severe cumulative heat loads during entry into an atmosphere, (iii) that permits reconfiguration of TPS material composition and/or TPS architecture when some important aspect of a space flight mission design changes, and (iv) for which a capability for reproducing or remanufacturing the TPS can be maintained and improved at modest expense and effort.

SUMMARY OF THE INVENTION

The disclosed invention meets these goals: (1) by providing a range of material compositions that can be uniform, multi-phase, with interconnected layers; (2) by providing a large variety of TPS architectures, each of which is reasonably efficient in a portion of the ranges of contemplated space vehicle use, which together cover the full range of such use; (3) by providing fibers and yarns, interwoven through the system, that receive and distribute a portion of the heat and mechanical stress that are generated by atmospheric entry; (4) by providing selected and different fiber spacings, to control local thermal conductivity within the TPS configuration; and (5) by providing different fiber spacings to control ablation performance within the TPS configuration. The woven TPS configuration (material composition plus architecture) can be adapted to cover a range of space vehicle and environment choices including vehicle entry velocity, vehicle entry flight path angle, initial time interval for vehicle deceleration, vehicle nose shape (e.g., blunt or wedge), maximum vehicle nose temperature anticipated, initial entry pressure, heating rate (variable with time), cumulative heat load, time interval for heating, and relevant atmospheric characteristics, among other attributes. The particular woven TPS configuration chosen is defined by several ablator parameters, some of which may be variable across the material(s) chosen. The phrase "woven TPS" refers to an ablator system that combines weaving of one, two or more thermally absorbing materials with controlled placement of fibers and yarns with controlled thermal conductivity, in order to optimize two or three dimensional redistribution of severe heating adjacent to an exposed layer of the material. Ideally, the woven TPS can be (re)designed for application to a specific space vehicle mission. Ideally, the woven TPS can be converted relatively easily between a single layer and a multiple layer material, between different fiber or yarn architectures and materials, and between different resin processes An ablative woven TPS, as disclosed here, is layered and is intended to limit or control conduction of heat from an exposed surface of the TPS into the ablator interior and into the vehicle substructure. Heating experienced by the substructure is thereby reduced or limited. An ablator may include many phases but generally includes a substrate that provides integrity and a pyrolyzing phase that is a polymer. For ablative WTPS, the constituents as a woven substrate may or may not include a pyrolyzing phase directly woven in. Additionally, a secondary infusion process can be used to add a pyrolyzing matrix phase.

WTPS has many variants. The 3-D woven substrate may be tailored to meet the specific mission application having multiple layers that can vary the composition and density locally in the material, depending on the weave parameters used. It is possible to weave in the pyrolyzing phase by using hybrid yarns that contain organic fibers, in addition to non-organic fibers, such as oxides, or carbon. This results in a dry, woven ablative TPS solution where a secondary infusion process is not necessary. Alternatively, an additional pyrolyzing phase may be incorporated by a secondary infusion process to yield a partially infused woven TPS, a surface densified woven TPS or a fully infused woven TPS.

Fibers are woven into the three dimensional "fabric" of the TPS material to connect adjacent or non-adjacent layers of the fabric in a vertical direction. Use of fiber connections of two or more layers provides one or more of several advantages: (1) layer-to-layer vertical (z-direction) thermal conduction is controlled or limited; (2) the fibers provide substantially improved tensile strength and/or shear strength in the vertical (z-) direction as compared to a two dimensional architecture with no vertical (z-) direction reinforcement; and (3) the fibers can be arranged in a graded or layered configuration to locally control the shape and flow rates of thermodynamic quantities. Presence of the fibers often allows the fibers to bridge, and thereby limit the severity of, a crack that may develop in the ablative material. Adjustment of material parameter values separately for each mission allows prompt optimization of each mission design, without requiring long lead times to determine the value adjustments.

Many parameters are important when designing a TPS material for a mission. It is important to minimize mass, thereby allowing increased mission payload. To better optimize a TPS material, a multilayer concept is attractive. A woven approach is suitable for providing multiple layers, which are mechanically connected in the weaving process, thereby eliminating a need for bonding or otherwise attaching discrete layers together. This allows for a robust external layer to resist ablation and spallation and more efficient insulating layers in the interior, where lower density and lower conductivity are preferred.

An ablator's "heat load" is estimated by integrating the temperature or other measure of thermal energy across a thickness of the ablator material for the duration of the heating, thus providing a single value representing the total thermal energy load. This single value does not take account of effects of a thermal gradient on surface recession. For example, a high magnitude thermal gradient will likely produce a surface recession depth d(rec;high) (corresponding to a distance measured into the ablator material) that is smaller than a surface recession depth d(rec;low) for a much lower magnitude thermal gradient, where each of the materials has the same overall heat load.

A "yarn" is a blend of several filaments of a single filament type or multiple filament types and compositions, which are combined together or otherwise associated to form a single blend that may combine features from the different contributing fibers. A yarn denier is a measure of a mass of a yarn, relative to a (reference) mass, expressed in units of grams per 9000 meters length. For woven TPS, a relatively fine yarn may have a denier in a range of 1,000-2,000. A relatively coarse yarn may have a denier value greater than 3,000.

Novel features of this hybrid approach include the following: (1) improvement of tensile strength and/or shear strength, using vertically oriented fibers arranged in a three dimensional configuration relative to a two dimensional material; (2) separate tailoring of first and second layer characteristics, where the first layer limits recession depth and the second layer is insulating; (3) thermal conductivity can be adjusted according to available materials; (4) separate conductive and non-conductive materials can be used for adjacent layers; (5) use of multi-functional structural and TPS materials; (6) multi-layer materials are integrated into a single system; (7) different fiber and yarn characteristics can be used; (8) fibers can be drawn from at least one of continuous and spun yarns; (9) fiber-fiber spacings can be varied within a layer; (10) secondary processing for infusion is not required for a dry woven material, where an ablative polymer is woven into the material; (11) secondary infusion can be used to add additional pyrolyzing polymer by either partially or fully infusing the woven substrate (12) density and thickness of a given layer can be variable; (13) surface densification is chosen so that exposed surface recession depth is less than surface layer thickness; and (14) late changes in system design are easily implemented.

DESCRIPTION OF THE INVENTION

Figure 1:
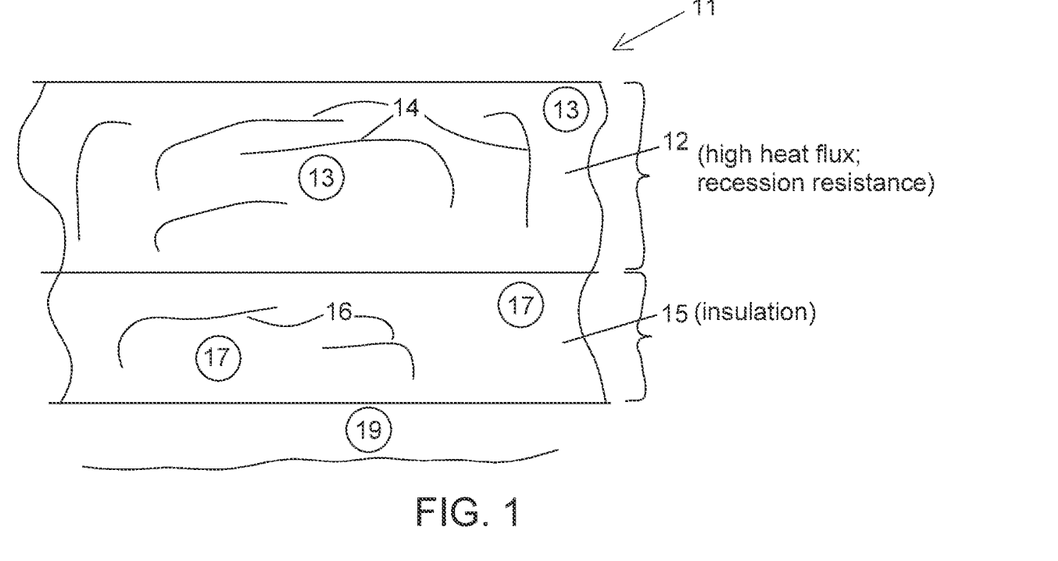
FIGS. 1 and 3 illustrate embodiments of an ablator system according to the invention.

FIG. 1 illustrates one suitable configuration for a woven TPS architecture 11. The system 11 has a first (exposed) layer 12 that is primarily a multi-layer, tight weave pattern (e.g., a plain weave with many connector fibers between the layers). The first layer 12 has a denier in a range of 1,000 to 2,000. This tight weave substrate consists of woven material 13 having fibers 14 (preferably at least one of carbon, phenolic, silica, alumina or another oxide or blends). The fibers 14 are interwoven between the remainder of the substrate material 13 to provide enhanced structural properties and/or thermal conductivity properties.

In one embodiment (high fiber volume fraction), the fibers 14 comprise about 50-65 percent of the volume of the first layer 12, with the remainder of the volume in the first layer 12 being either void or a resin matrix. In this embodiment, a second layer 15, adjacent to the first layer 12, contains a lower volume fraction of fibers 16, with a range of about 40-65 percent of the volume being fiber content and the remainder 17 being non-fiber content. A resin (not explicitly shown) is optionally added to the first layer 12 and is optionally added to the second layer 15. The resin may comprise one or more of phenolic, polyimide, cyanate ester, phthalonitride. PBO and PBI. The final materials may be (i) dry (no resin), (ii) moderately infused with resin (resin fraction≤70 percent of the maximum achievable), or (iii) fully infused with resin (resin fraction>70 percent of the maximum achievable). The first layer 12 will withstand relatively high heat flux and is a recession-resistant layer. The second layer 15 serves as a thermally insulating layer, preferably with lower thermal conductivity and relatively high thermal heat capacity, than the first layer 12. For example, the layer 12 may consist of carbon yarn, and the layer 15 may consist of the blended carbon phenolic yarn. Additional layers of material, for example, oxides, such as silica, alumina, zirconia and/or organic polymer yarns, are preferably positioned so that the second layer 15 lies between the first layer 12 and an additional (third or more) layer. Oxide-based yarns have lower thermal conductivity than do carbon-based yarns so that a functionally graded carbon-to-oxide weave can also be used to locally control thermal conductivity.

Figure 2A:
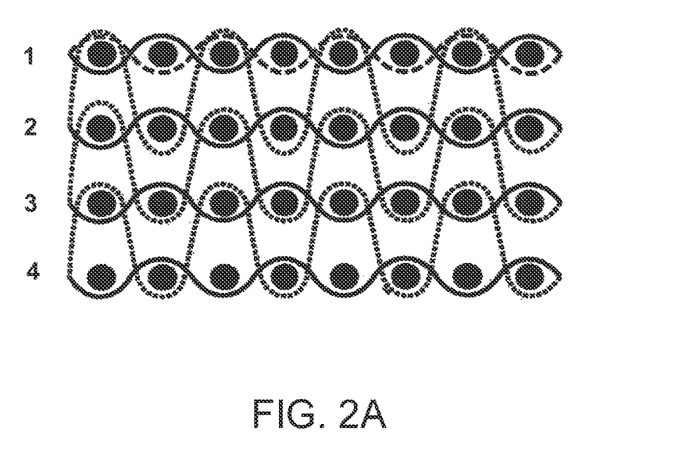
FIGS. 2A, 2B and 2C illustrate some suitable yarn connectivities.
Figure 2B:
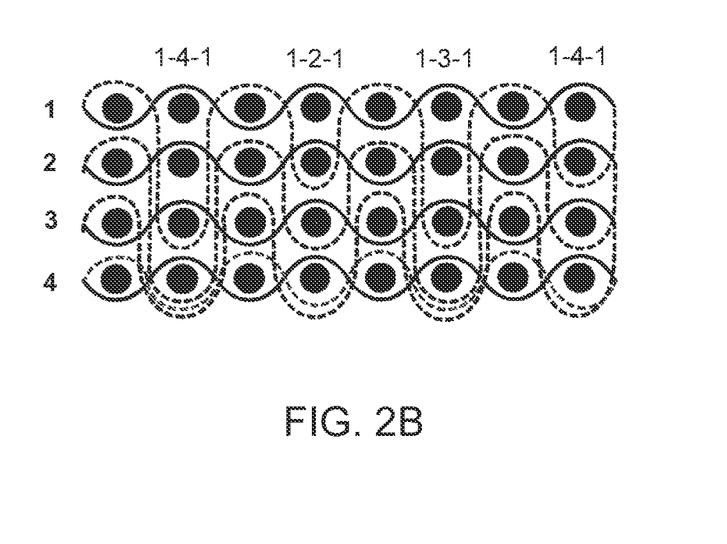
Figure 2C:
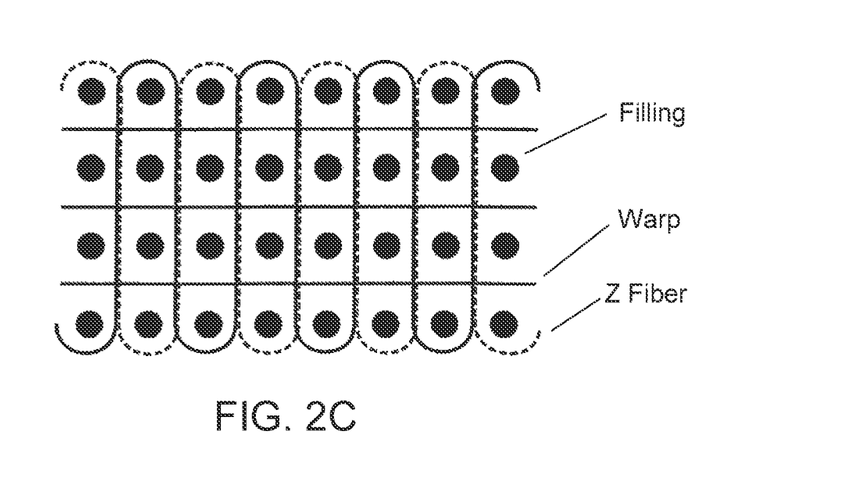

The fibers 14 in FIG. 1 may connect adjacent sub-layers (e.g., 1-2, 2-3, 3-4, etc.), as illustrated in FIG. 2A, to provide "adjacent connectivity." In another embodiment, illustrated in FIG. 2B, the fibers 14 may connect sub-layer 1 with sub-layer 3 and/or sub-layer 2, sub-layer 2 with sub-layer 4 and/or sub-layer 3, and so on, to provide "non-adjacent connectivity" (one or more fiber layers separating two layers connected by a fiber). FIG. 2C illustrates an orthogonal weave, in which a single fiber may connect all, or nearly all, layers in a third (z-) direction The patterns illustrated in FIGS. 2A, 2B and 2C are examples of thousands of layer connectivity patterns that can be used as part of the invention, with each such pattern connecting at least two layers or at least three layers (adjacent, skip-adjacent or non-adjacent).

Figure 3:
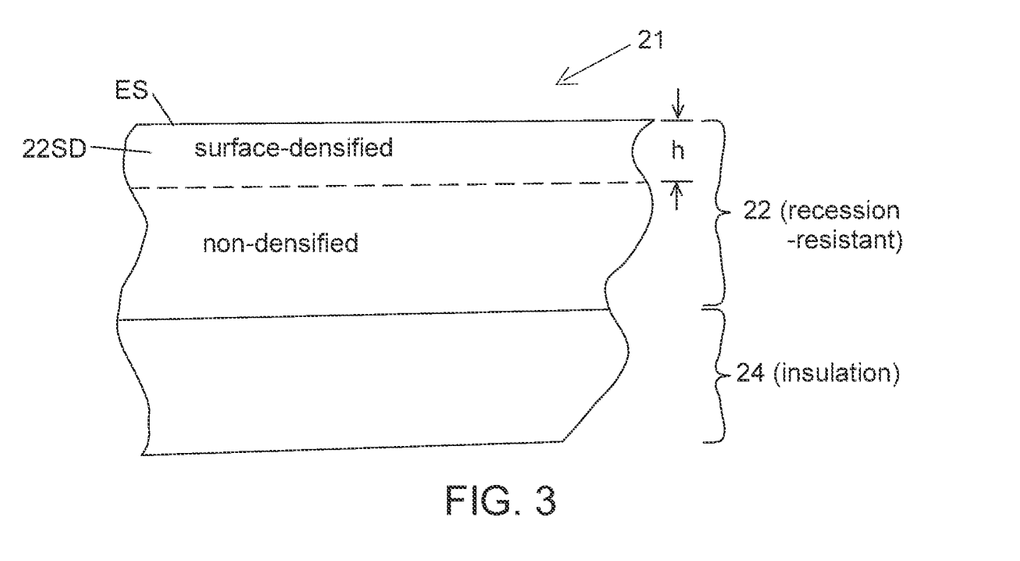

In another embodiment 21, illustrated in FIG. 3, a selected portion or all of the first layer 22, beginning at an exposed surface ES of the first layer and proceeding toward the first layer interior, is further modified by surface densification, by spraying or using B-stage resin film infusion (e.g., at least one of phenolic, polyimide, cyanate ester, PBI, PBO, and phthalonitrile) to deposit a higher resin density in this selected portion.

A surface densified ablator material may be prepared by spraying or by B-stage resin film infusion (described in the following) or by otherwise exposing one or more exposed surfaces of an open cell material, a woven carbon preform or similar material. The woven preform material preferably has a porosity in the range of 40-65 percent, with representative density about 0.7 to 1.1 g/cm$^3$ if it were a carbon layer, before infusion with a phenolic or other resin, including polyimide, cyanate ester, phthalonitrile, PBO. PBI and/or similar resin. This resin is allowed to diffuse into the first layer 22 to a representative diffusion depth h, and this first layer is subsequently cured. The diffusion depth h ($\approx$1-20 mm) is preferably chosen to be greater than an estimated recession distance d(rec) of the first layer 22, when subjected to the temperature range and pressure range that are anticipated for the chosen mission. The diffusion depth h is preferably no greater than a thickness of the first layer 22, but may be greater. A portion of Layer 1 that is not surface densified normally contains little or no resin. When the depth h of the surface densified portion is chosen to be less than the estimated surface recession distance d(rec) experienced during a mission, the first layer material may fail, through development of a "tunnel" or other unacceptable ablation behavior that allows a portion of the first layer of the material to be removed or ablated beyond what is acceptable to maintain bondline integrity at the TPS to substructure interface.

Figure 4:
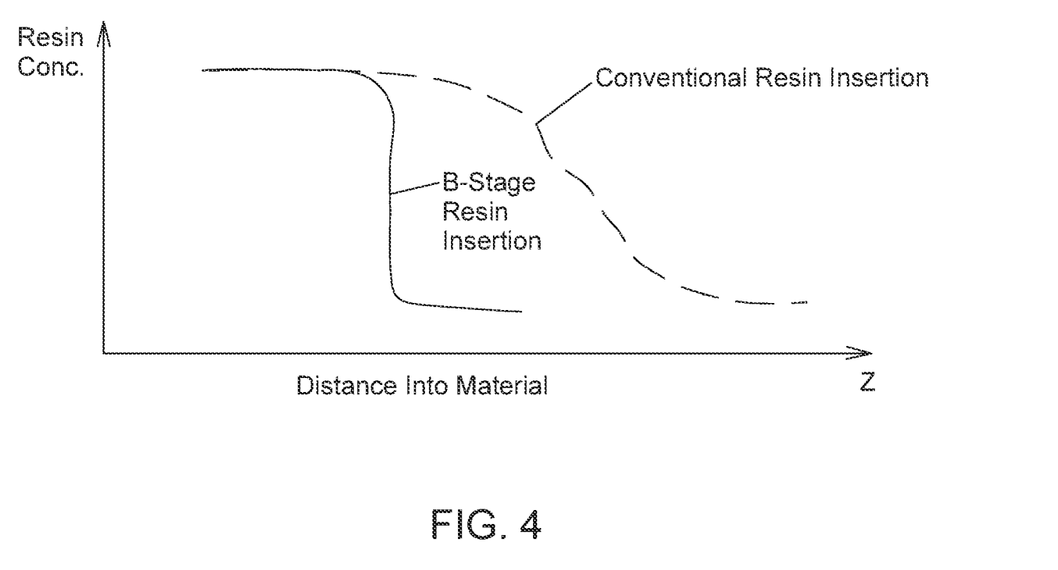
FIG. 4 graphically illustrates a representative resin density versus distance from an exposed preform surface, as a result of B-stage resin film infusion.

In resin film infusion, a relatively high viscosity B-staged resin is forced into the target layer material (e.g., carbon yarn) at an exposed surface of the target layer at a specified temperature and pressure, depending upon the resin used. With this procedure followed, the resin density develops a "front" with a greater slope than a normal diffusion front as the resin diffuses through the target layer material. The shape of the resin front is not as sharp as a step function. Use of B-stage resin film infusion produces a steep transition from a relatively high resin density region (adjacent to the exposed surface) to a lower resin density region, or inversely, as illustrated in FIG. 4. This allows some control of density at a transition location in surface densification. The second layer of the system, 11 or 21, in either embodiment may be a blended yarn containing at least one of carbon, phenolic, silica, alumina, another oxide or spun carbon, with interwoven carbon fibers 15 having either adjacent connectivity or non-adjacent connectivity. The first layer. 12 or 22, provides a relatively high thermal gradient across the material 12 in the z-direction, and the second layer, 15 or 24, serves as a thermal insulator if the local temperature is reduced sufficiently.

Optionally, a third layer 19 in FIG. 1, comprising silica, alumina, zirconia, another oxide, and/or organic polymer or blended woven material, has a fiber fraction similar to that of the second layer and provides further thermal insulation of the system. Silica melts at lower temperatures than a sublimation temperature of carbon-based materials in the first layer, 12 or 22, but where the maximum temperature in the silica is sufficiently reduced, melting of silica can be prevented.

Optionally, the system 11 or the system 21 has a heat transformation layer covering most or all of what would otherwise be an exposed surface of the system. Where the thickness h of the heat transformation layer is sufficiently large, this layer acts as a sacrificial layer that is mostly or fully transformed to char. The first layer material is heated to extreme temperatures but undergoes reduced charring or to other heat transformation processes. The TPS ablator system, 11 or 21, overlies and fully protects an assembly of carrier structure (e.g., composite or metal structural tiles, not shown here) that are expected to experience a severe heating environment upon entry into an atmosphere associated with a planetary body. A portion of the ablator is expected to become charred or volatilized during entry. In determining a design and material composition of a TPS ablator system, the following environmental and mission parameters, among others, are considered:

estimated atmospheric pressure at the body's surface,
vehicle entry flight path angel (EFPA),
estimated terminal velocity at surface heating time interval,
maximum heating rate,
estimated heat load,
estimated heat load gradient,
estimated surface recession depth.

Estimates of suitable material and design parameters are developed from the preceding seven entry environmental conditions, including the following:

layer 1 thickness and material composition and constituent properties,
layer 2 (or subsequent) thickness, material composition and constituent properties,
fiber connectivity (e.g., adjacent or non-adjacent, layer-to-layer or orthogonal),
resin insertion, as a fraction of maximum resin insertion,
presence or absence of surface densification,
extent of resin insertion (fraction of full density), and
placement (depth from surface) of resin densification.

Example 1

Entry into a Saturn-like atmosphere of a 1-meter, conical nose entry vehicle. Saturn has an estimated maximum atmospheric pressure p(Saturn), at or near the planet's surface, of about 104 kPa, which is about 1 percent of p(Earth), and has an estimated planetary mass m(Saturn) of about 95 times m(Earth). This results in an estimated terminal velocity (at Saturn's surface of 20-28 km/sec, an estimated peak pressure of 0.8-12 atm, a relatively high maximum heat flux of 1,900-14,000 W/cm$^2$, an estimated maximum heat load of 120-630 J/cm². A suitable TPS heat shield for an approach to the Saturn surface may have the following shield characteristics:
  layer 1 carbon thickness 1.6 cm.
  layer 2 blend thickness 4.4 cm,
  total thickness of combined layers 6.0 cm, Example 2

Entry into a Venus-like atmosphere of a 3.5-meter diameter, conical nose entry vehicle. Venus has an estimated maximum atmospheric pressure p(Venus), at or near the planet's surface, of about 9.3 MPa, which is about 9 times that of p(Earth), and has an estimated planetary mass m(Venus) of about 0.8 times m(Earth). This results in an estimated terminal velocity (at Venus's surface) of 10-12 km/s, an estimated peak pressure of 0.9-10 atm, a relatively high maximum heat flux of 760-5400 W/cm² and an estimated maximum heat load of 12-34 J/cm². A suitable TPS heat shield for an approach to the Venus surface may have the following shield characteristics:
  layer 1 thickness 0.2 cm.
  layer 2 blend thickness 2.5 cm,
  total thickness of combined layers 2.7 cm.

For each approach, the vehicle entry flight path angle is assumed to be in a range 5-10°, initial heating time interval 1 is 5-90 s, heating rate (variable with time) is 760-14000 W/cm², and heat load is 12-5400 J/cm² The infrastructures for Examples 1 and 2 are obtained using a thermal response tool. FIAT, and known material properties of each layer, including density and thermal conductivity. Note that each of the Examples 1 and 2 includes heat fluxes in a sub-range 1500-4000 W/cm², where the conventional approaches, including use of fully dense carbon phenolic material, are not efficient. Use of other materials and of innovative fiber configurations extends the range of heat fluxes, with no substantial loss in efficiency.

Table 1 represents some results of a TPS sizing study performed on the environmental configurations set forth in Examples 1 and 2, with a goal of estimating the minimum layer 1 thickness required for "survival" of the space vehicle. A survival thickness for layer 1 is taken to be a thickness equal to (1+f) times an estimated recession depth d(rec) of the layer 1 material, where f is a selected non-negative fraction (e.g., f=0.5-1) that may be taken to be 0 in some situations. The differences for different headings (30° versus 90° relative to a North pole for the Saturn probe arise from accounting for presence of the substantially planar rings located at an equator (θ=90°) of Saturn (non-isotropic).

TABLE 1

TPS Sizing Study Ranges.

| | Saturn probe | Venus probe |
| --- | --- | --- |
| Nose configuration | 45° | 45° |
| Vehicle max. diameter | 1.0 m | 1.0 m |
| Vehicle entry mass | 250 kg | 2750 kg |
| Atmos. entry velocity | 26, 28 km/sec | 10.8, 11.6 km/sec |
| Entry flight path angle (EFPA) | −6.5° | −8.5° |
| Vehicle heading | 30°, 90° | isotropic |
| Peak heat flux (W/cm²) | 1900-14,000 | 760-5400 |
| Integrated heat load (kJ/cm²) | 120-630 | 12-34 |
| Equivalent heating time | 45-63.2 s | 6.3-15.8 s |
| Peak pressure | 0.8-12 atm. | 0.9-10 atm. |
| Peak G-load | 14-200 | 18-190 |
| Minimum layer 1 thickness | 1.6 cm | 4.4 cm |
| Layer 2 thickness | 0.8 cm | 2.5 cm |

Figure 5:
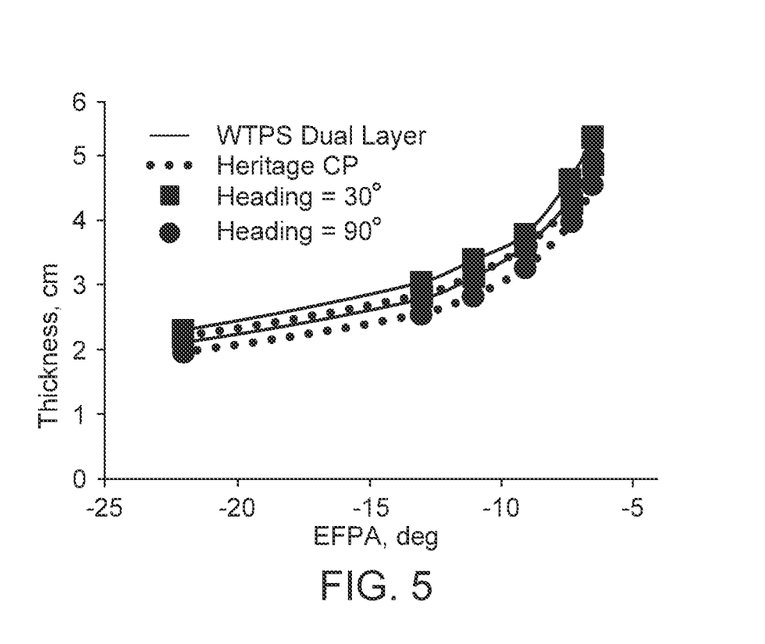
FIGS. 5 and 6 graphically compare some TPS figures of merit for an heritage TPS configuration and a multiple layer configuration for a Saturn probe.

FIG. 5 graphically illustrates variation of the required layer 1 plus layer 2 thickness (Saturn) for different entry flight path angle (EFPA) values (−23° to −7°). The total thickness values for a given EFPA value fall within a narrow range, and these thickness values rise monotonically as EFPA approaches 0°, corresponding to horizontal flight at atmosphere entry.

Figure 6:
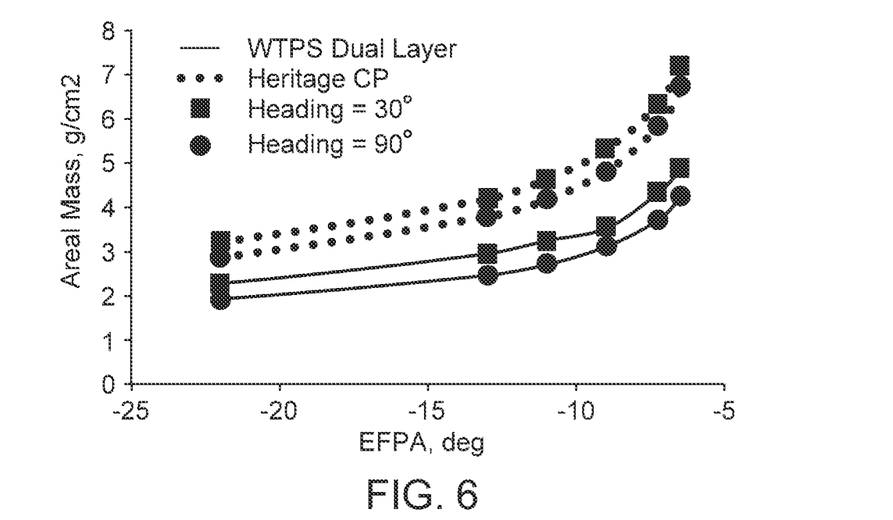

FIG. 6 graphically illustrates the minimum areal mass (g/cm²) required (Saturn) for the same range of EFPA values as in FIG. 5. In FIG. 6, however, the minimum areal mass for the heritage configuration is approximately 50 percent higher than the required areal mass for the multiple layer configuration disclosed in the invention, for the values of EFPA that are disclosed here. The minimum areal mass values for the multiple layer configuration for the heading angles of 30° and 90° are very similar for the values of EFPA shown in FIG. 6. These results appear to indicate that, for a Saturn probe: (1) for a wide range of EFPA values, not too close to horizontal atmospheric entry at EFPA=0°, the multiple layer configurations for a fixed EFPA value all have similar areal mass values, and a required areal mass value will increase monotonically as EFPA approaches 0°; (2) the required areal mass for the multiple layer configuration is about two-thirds of the required areal mass for an heritage configuration, with corresponding total mass savings; and (3) the mass savings for a multiple layer configuration provides additional flexibility in choice of TPS architecture.

In determining a design and material composition of a TPS ablator system, the following environmental and mission parameters, among others, are considered in a multiple layer configuration:
  maximum atmospheric pressure at the body's surface,
  terminal velocity of space vehicle,
  vehicle entry flight path angle
  vehicle estimated terminal velocity,
  heating time interval,
  maximum heating rate,
  estimated heat load,
  estimated surface recession depth.

Estimates of suitable material and design parameters are developed from the preceding nine conditions, including the following:
  layer 1 thickness, material composition and constituent properties,
  layer 2 thickness and yarn blend, if any, and constituent properties,
  fiber connectivity.
  resin insertion, as a fraction of maximum resin insertion,
  presence or absence of surface densification.

One appropriate procedure here begins with a specification of M of the nine conditions set forth in the preceding paragraph (1≤M≤9). Specification of each of the M parameters will introduce one or more limitations on choice(s) of one or more of the material parameters set forth in the preceding paragraph. In some instances, specification of the combination of M conditions may require that one or more of the parameters values lie(s) outside the parameter range(s) available. For example, for a particular maximum heating rate and an estimated heat load, the estimated surface recession depth may be equal to or larger than the available layer 1 thickness for the layer 1 material composition(s) available. This situation will require a reformulation of the conditions available for the particular mission, in order to avoid recession that consumes the entire layer 1 thickness.

Assuming that specification of the M conditions is consistent with the available conditions, application of the M conditions will limit the choice(s) of the available parameter values. Preferably, the M conditions are specified in a fixed order, chosen so that the least restrictive conditions are specified first. This may prevent, or minimize, the possibility that initial choice of a condition will act as a "spoiler" that removes all combinations of the other conditions from consideration.

Figure 7:
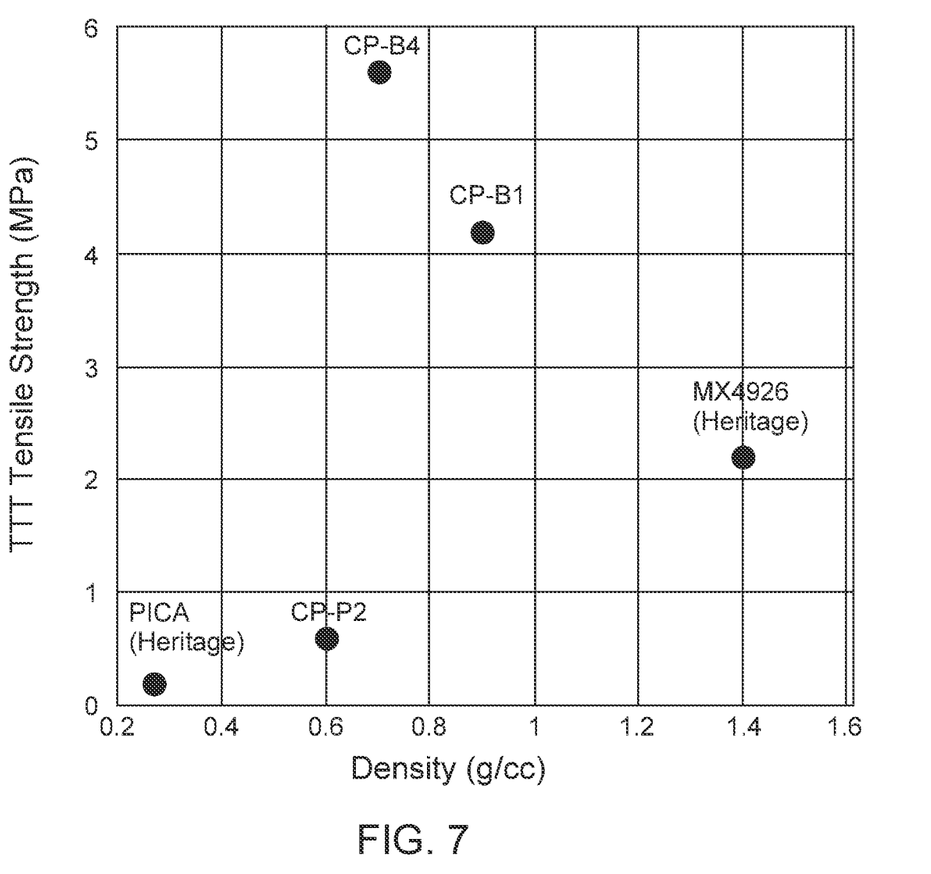
FIG. 7 is a graphical illustration of system tensile strength versus system density for some heritage materials and for some systems prepared according to the invention.

FIG. 7 is a graphical illustration of system tensile strength versus system density for some heritage materials and for some systems prepared according to the invention. The well-known ablator material PICA has a very low density, about 0.25 g/cm$^3$, and a relatively low tensile strength, about 0.2 MPa. Tensile strengths for the two-dimensional heritage materials illustrated in FIG. 7 have a maximum value of about 2.2 MPa (density 1.4 g/cm$^3$) for MX4926 (heritage, 2D carbon phenolic).

For the systems prepared according to the invention, the measured tensile strengths are about 4.1 MPa (CP-B1; blended yarn weave; light phenolic infusion) and about 5.7 MPa (CP-B4; blended yarn weave; full phenolic infusion) for system densities of 0.9 g/cm$^3$ and 0.6 g/cm$^3$, respectively. The CP-B4 system provides an increase in tensile strength of approximately 180 percent, relative to the heritage MX4926 material, with a system density that is about 42 percent of the density of the MX4926 material.

Figure 8:
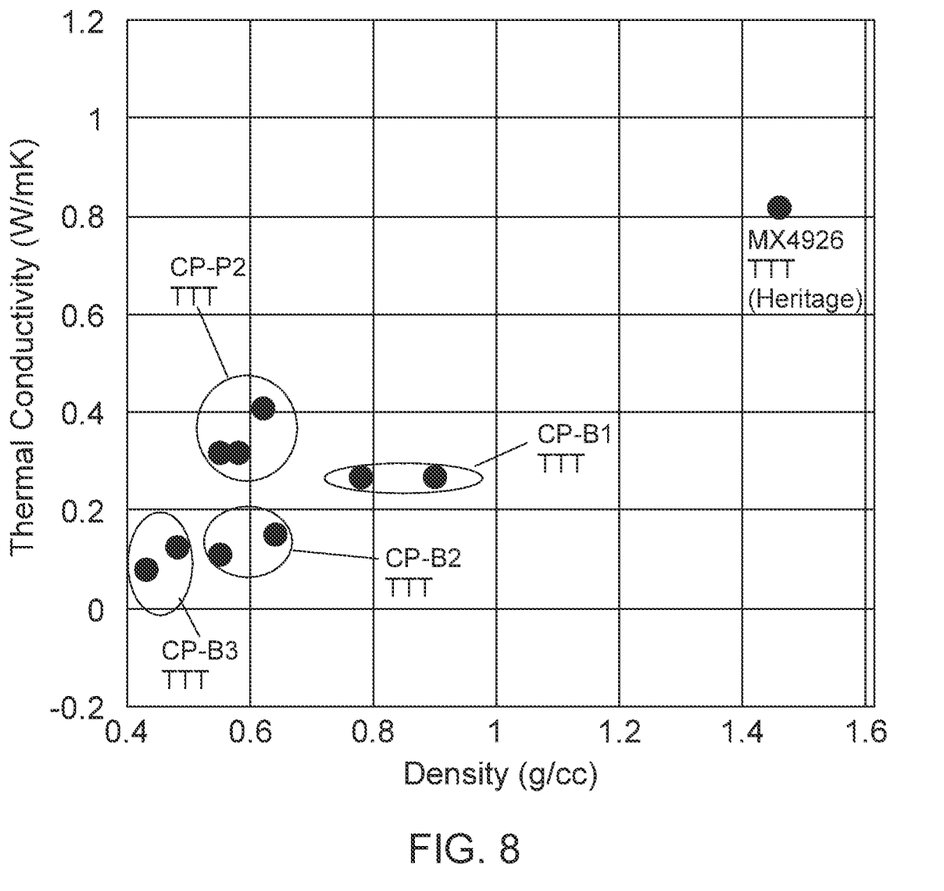
FIG. 8 illustrates modification of thermal conductivity by choice of weave architecture and/or yarn constituents.

FIG. 8 illustrates modification of thermal conductivity by choice of weave architecture and/or yarn constituents. Traditional carbon phenolic MX4926 has a density of about 1.45 g/cm$^3$ and a relatively high thermal conductivity. Materials prepared according to the disclosed invention have densities of 0.4-0.9 g/cm$^3$ and much lower thermal conductivity values.

Figure 9:
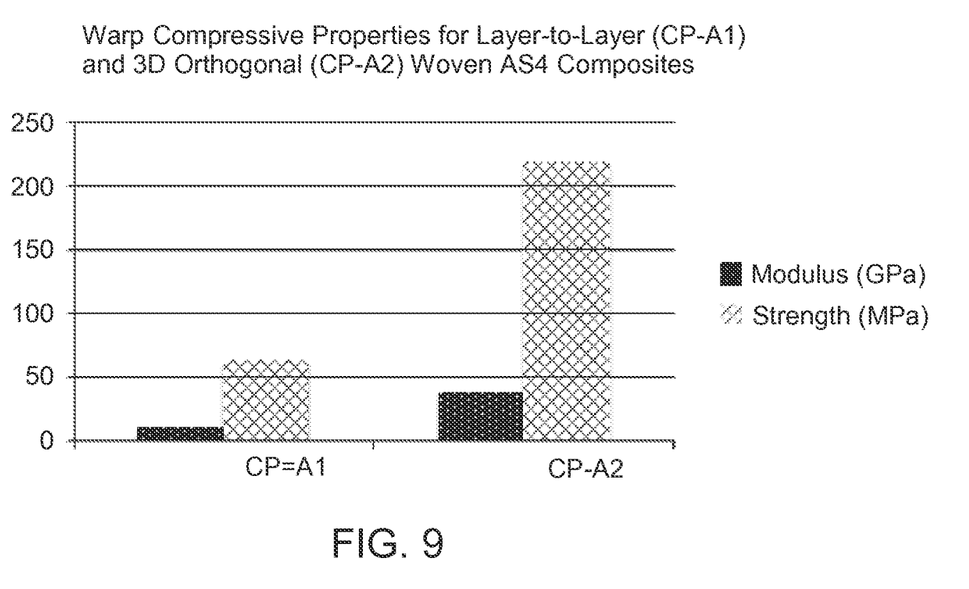
FIG. 9 graphically compares elastic modulus and tensile strength for a layer-to-adjacent layer weave and an orthogonal weave.

FIG. 9 graphically compares mechanical properties (elastic modulus and tensile strength) for a layer-to-(adjacent) layer woven composite (CP-A1) with a 3D orthogonal woven composite (CP-A2). For each of the formats, the elastic modulus for an orthogonal weave is about 3.5 times as large as an elastic modulus for a layer-to-layer weave, and tensile strength is about 3 times as large for the orthogonal weave as for the layer-to-layer weave, using a fully dense phenolic resin insertion for each of the weave formats. The corresponding densities are 1.46 g/cm$^3$ and 1.37 g/cm$^3$ for the orthogonal and layer-to-layer weaves, respectively. In this instance, one obtains a more than three-fold increase in elastic modulus and tensile strength for a 6.6 percent increase in density.

Figure 10:
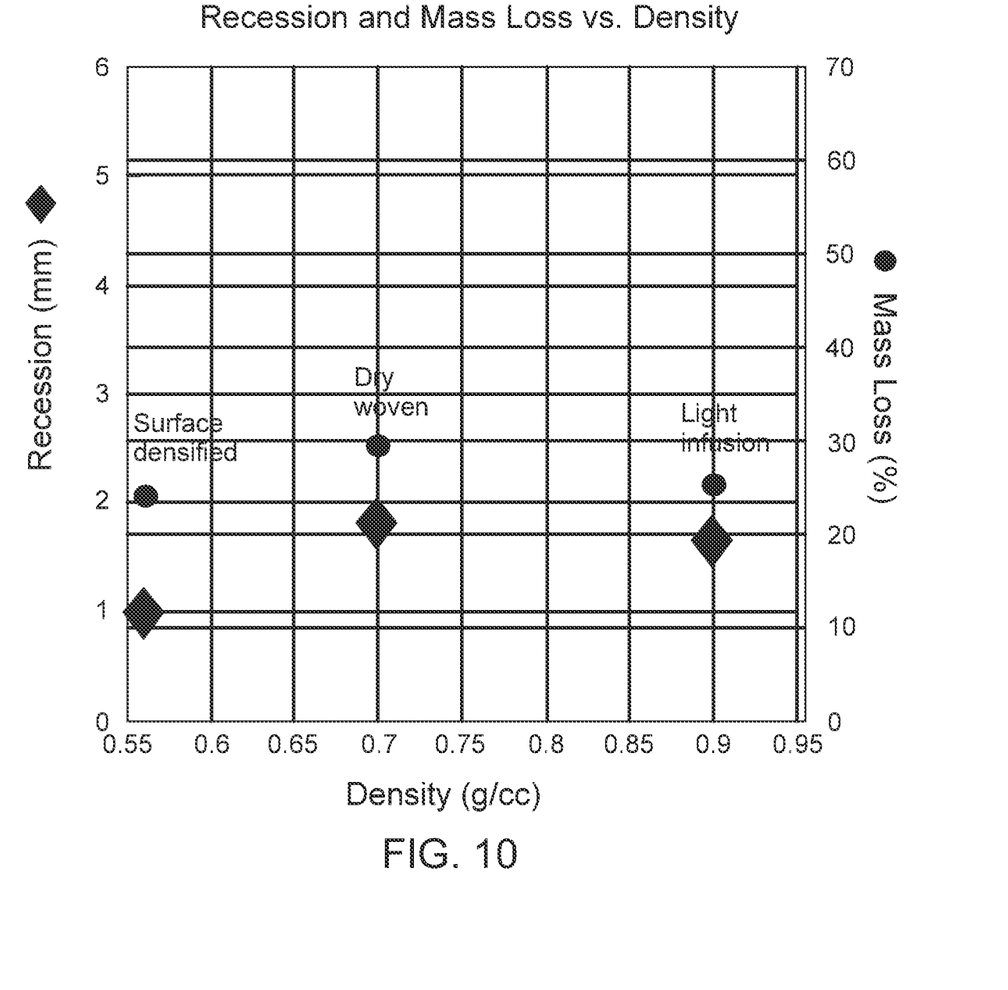
FIG. 10 graphically illustrates recession depth (left hand ordinate), expressed in mm, and mass loss (right hand ordinate), expressed in percent of initial mass, for a representative dry woven system, a representative light phenolic infusion system, and a representative surface densification system.

FIG. 10 graphically illustrates post arc jet test recession depth (left hand ordinate), expressed in mm, and mass loss (right hand ordinate), expressed in percent of initial mass for a representative dry woven system, for a representative light phenolic infusion system, and for a representative surface densification system, with system densities of about 0.70 g/cm$^3$, 0.90 g/cm$^3$ and 0.56 g/cm$^3$, respectively. The lowest recession depth, smallest mass loss and smallest associated density are associated with the surface densified, dual layer woven CP. This illustrates an advantage of a dual layer architecture, where a modest increase in mass adjacent to an exposed surface can provide substantial recession and mass loss benefits for the entire system.

Figure 11:
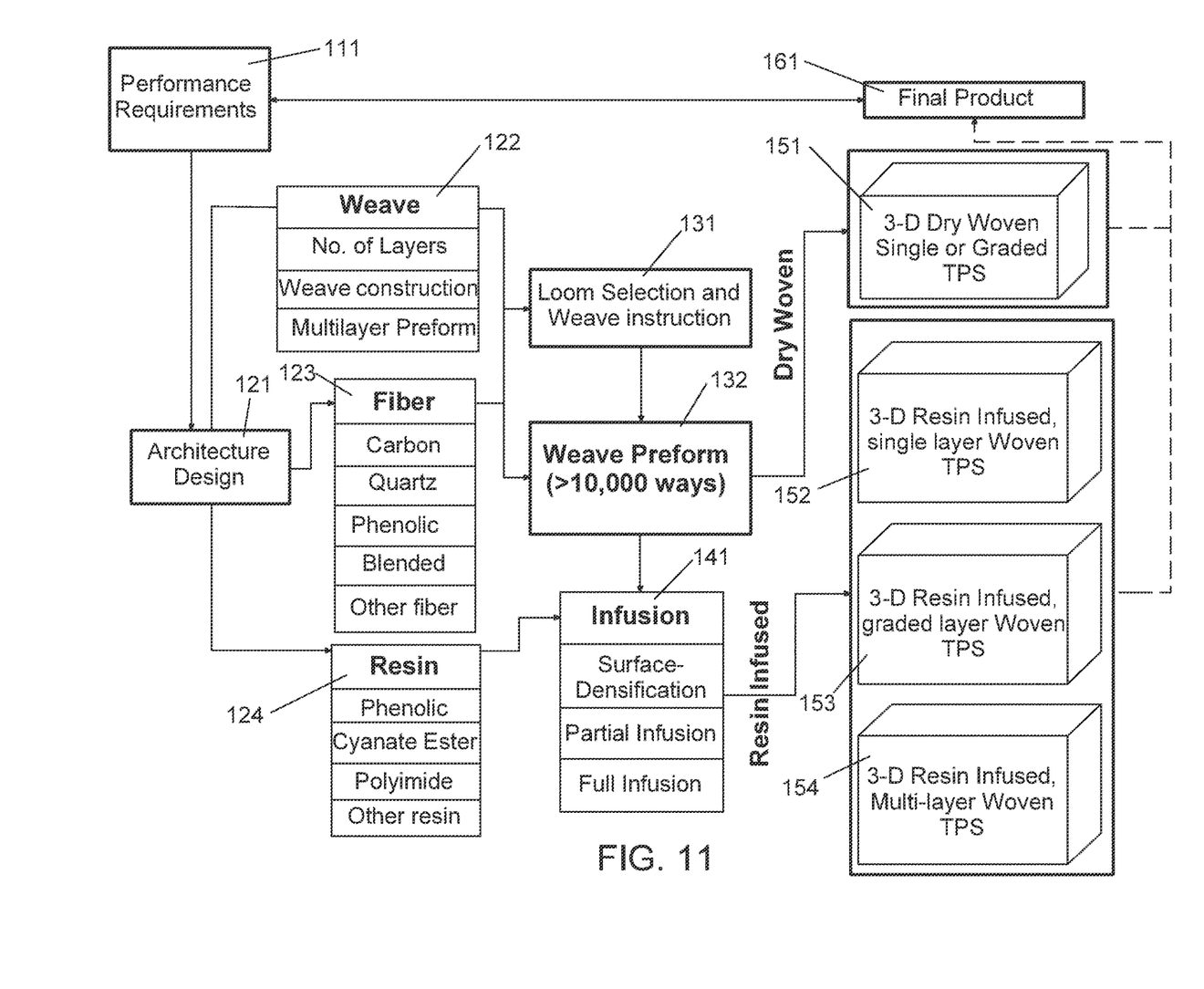
FIG. 11 illustrates various information pathways for producing a final TPS product according to different embodiments of the invention.

FIG. 11 schematically illustrates various options available under different versions and embodiments of the TPS invention. A TPS Performance Requirements module 111 analyzes and distributes this information to an Architectural Design module 121, which distributes relevant portions of this information to a Weave module 122, a Fiber module 123 and a Resin module 124. The Weave module 122 and the Fiber module 123 analyze and distribute relevant portions of this information to a Loom Selection And Weave module 131 and a Weave Preform module 132, which further analyze and provide relevant information for a Dry Woven Single Or Graded TPS module 151.

The Resin module 124 analyzes and provides relevant information for an Infusion module 141, which estimates resin density, surface densification, if any, and any secondary processing (e.g., partial or full infusion) that may be appropriate. Where non-zero resin infusion is called for, relevant information from the Infusion module 141 is received and analyzed by three modules, 152, 153 and 154, that address single (uniform) layer, graded layer and multi-layer woven TPS. Information from the modules 151, 152, 153 and 154 is received by a Final Product module 161, with feedback to the Performance Requirements module 111 to adjust parameters in an iterative approach.

Summary of Surface Densification Process.

Surface densification can be accomplished by two approaches: resin film infusion or applying the resin directly to the woven outer surface by a spraying or painting application taking care to apply a known mass of resin to a known area of material to control the resin loading. Suitable resins include phenolic, cyanate ester, polyimide, phthalonitrile, PBO, PBI and combinations thereof.

In resin film infusion, a relatively high viscosity B-staged resin is forced into the target layer material (e.g., woven preform) at an exposed surface of the target layer at a specified temperature and pressure, depending upon the resin used. With this procedure followed, the resin density develops a "front" with a greater slope than a normal diffusion front as the resin diffuses through the target layer material. The shape of the resin front is not as sharp as a step function. Use of B-stage resin film infusion produces a steep transition from a relatively high resin density region (adjacent to the exposed surface) to a lower resin density region, or inversely, as illustrated in FIG. 4. This allows some control of density at a transition location in surface densification.

In a spray or paint application of a selected resin, such as an undiluted resin or a mixture of the resin, with a suitable solvent such as ethanol ("Eth"), methanol ("Meth"), isopropyl alcohol ("IPA"), another alcohol, an ether, an aldehyde, a ketone, a carboxylic acid, and/or an ester as solvent, is applied to substantially uniformly cover a surface of the woven material. Depending on the processing conditions and viscosity of the resin the diffusion into the perform may be controlled. The spray/paint/diffusion procedure may be repeated, if desired, to modify the resulting density profile of the surface region and/or to vary the thickness of the modified surface region.

CONCLUSION

The invention disclosed here uses a woven material, prepared by any of at least three processes, as a basis for a thermal protection system material: (1) a dry woven TPS material that is produced in a single weaving process using a blended yarn or set of yarns that may consist of various compositions such as carbon, ceramic oxide, polymer or a blend thereof, containing both carbon and an ablative polymer constituent, produced in a single step with a single density or as a low-to mid-density graded material, without requiring infusion of a resin; (2) a woven TPS material, moderately infused with a resin (matrix phase) to yield a mid-density material; and (3) a high density TPS material, fully infused with a resin matrix phase. The fraction of resin infusion can be varied according to the mission.

Use of a dual layer or multi-layer woven TPS material allows the weave to comprise an outer, higher density layer that is recession resistant and an inner insulator layer, with reduced areal mass, as compared with a monolithic layer. The multiple layer woven TPS material can be balanced between relatively low thermal conductivity and relatively high mechanical strength, relying on different fiber properties and weaving architectures. A weave with layer-to-layer connectivity appears to be most suitable for control of thermal conductivity between the layers, while a three dimensional orthogonal weave (all, or nearly all, layers connected by a vertically oriented fiber) provides the most robust structural performance. A dual multi-layer woven TPS material has no discrete interface between layers.

Use of continuous fibers appears to be best suited to provide a recession-resistant outer layer. The thickness of each layer can be chosen to correspond to a specific mission entry environment. Performance of a dual layer or multiple layer can be further enhanced or modified by use of localized surface densification of a recession-proof layer, for example, by supplemental resin infusion. Spun yarns are preferred for an insulating layer, with relatively low density. A higher bulk in a spun yarn is important in achieving efficient thermal insulation.

Many resins and fibers have been evaluated for suitability, including organic and various continuous and spun carbon fibers, organic polymer fibers (e.g., phenolic, PBI, PBO and polyimide) and oxide fibers (e.g. quartz), and resin matrix polymers (e.g., phenolic, cyanate ester, polyimide, phthalonitrile, PBO, PBI and combinations thereof). The woven TPS approach to manufacturing heat shield materials offers a possibility to maintain a capability or to quickly restart this process, if the process becomes temporarily dormant. The approaches disclosed here allow one to balance a thermal load and a mechanical load, by choice of a proper fiber and/or resin and a proper weave, according to the anticipated atmosphere entry conditions.

What is claimed is:

1. A thermal protection system (TPS) for installation onto a surface of a heat-exposed vehicle, the TPS having at least two layers, the at least two layers comprising:
    a first layer of material comprising a plurality sub-layers, each sub-layer of the plurality of sub-layers of the first layer comprising a two-dimensional woven structure having a plain weave architecture in a tight weave pattern of yarns, each sub-layer in the first layer comprising a same architecture and density as other sub-layers in the first layer, the first layer of material having an external surface for interfacing with high temperatures; and
    a second layer of material comprising a plurality of sub-layers, each sub-layer comprising yarns configured in an x- or a y-direction or yarns woven together in an x- and y-direction, each sub-layer in the second sub-layer comprising a same architecture and density as the other sub-layers of the same direction in the second layer,
    wherein the architecture of the sub-layers of the first layer is different than the architecture of the sub-layers of the second layer,
    wherein the first layer is adjacently connected to the second layer by a single yarn that is inserted in a z-direction at a point through at least a last sub-layer of the first layer and at an adjacent point in a first sub-layer of the second layer, the first sub-layer of the second layer adjacent to the last sub-layer of the first layer,
    wherein each sub-layer of the first and second layers receives the single yarn inserted through each layer at least once,
    wherein the first layer is configured to be positioned superficial to the second layer on the TPS, and the second layer is configured to be positioned deeper than the first layer and closer to the vehicle's surface, and
    wherein the first layer comprises a higher density compared to one or more subsequent layers.

2. The TPS of claim 1, wherein the 3D orthogonal weave connects the plurality of sub-layers in a third or z-direction using one or more fibers to limit or control thermal conduction.

3. The TPS of claim 1, wherein each of the at least two layers further comprises a plurality of sub-layers connected to each other using the 3D layer-to-layer weave or the 3D orthogonal weave such that the plurality of sub-layers are contiguous to each other.

4. The TPS system of claim 1, wherein one or more of the at least two layers comprise the organic fiber or a blend of the carbon fiber and organic fiber with a fiber volume fraction of 45 to 60 percent.

5. The TPS system of claim 1, wherein the first layer comprises a diffusion depth to allow resin to diffuse into the first layer, wherein the diffusion depth is no greater than a thickness of the first layer.

6. The TPS system of claim 1, wherein the one or more subsequent layers are configured to serve as thermal insulators.

7. The TPS system of claim 1, wherein the first layer of material comprises a heat transformation layer covering majority of, or all of, the external surface of the first layer, the heat transformation layer is an exposed surface of the TPS system configured to reduce charring or heat transformation of the first layer during entry into an atmosphere of a planetary body.

8. The TPS of claim 1, wherein the plurality of sub-layers are adjacently connected, non-adjacently connected, or adjacently and non-adjacently connected.

9. The TPS system of claim 1, wherein the sub-layers of the first layer are composed of a non-blended yarn, and the sub-layers of the second layer composed of a blended yarn.

10. The TPS system of claim 1, wherein the first layer of material has a higher volume fraction of fibers than the second layer of material.

11. The TPS system of claim 1, wherein the TPS has a thermal conductivity range of 0.1 to 0.4 W/m-K.

12. The TPS system of claim 1, wherein the thermal conductivity of the second layer is lower than the first layer.

13. The TPS system of claim 1, wherein the sub-layers of the first layer are composed of carbon yarn, and the sub-layers of the second layer composed of blended carbon phenolic yarn.

14. The TPS system of claim 1, wherein the first layer is recession-resistant.

15. The TPS system of claim 1, wherein each of the sub-layers of the first layer and in the sub-layers of the second layer are connected by the single yarn in a layer-to-layer weaving pattern in the z-direction.

16. The TPS system of claim 1, the TPS comprising a third layer of material of a plurality of deeper layers of material, the third layer composed of oxide-based yarns, wherein the third layer of material has a lower thermal conductivity than the second layer of material, the third layer of material adjacently connected to the second layer.

17. The TPS system of claim 1, wherein the external surface of the first layer of material is subject to a resin film infusion process.

18. The TPS system of claim 1, wherein the resin film infusion process includes forcing a high-viscosity B-staged resin into at least the first layer from the external surface, and creating a surface-densified material.

19. The TPS system of claim 1, wherein each of the sub-layers of the first layer and in the sub-layers of the second layer are connected by the single yarn in a 3D orthogonal weaving pattern in the z-direction.

* * * * *